United States Patent [19]
Govindaraju et al.

[11] Patent Number: 6,012,121
[45] Date of Patent: Jan. 4, 2000

[54] APPARATUS FOR FLEXIBLE CONTROL OF INTERRUPTS IN MULTIPROCESSOR SYSTEMS

[75] Inventors: Rama K. Govindaraju, Poughkeepsie, N.Y.; Mandayam T. Raghunath, Bangalore, India

[73] Assignee: International Business Machines Corporation, Armonk, N.Y.

[21] Appl. No.: 08/835,459

[22] Filed: Apr. 8, 1997

[51] Int. Cl.[7] ...................................................... G06F 9/46
[52] U.S. Cl. ......................... 710/260; 710/262; 709/201; 709/203; 370/396
[58] Field of Search ............................. 395/733, 200.31, 395/200.33, 735, 200.02; 364/284.3; 370/396; 710/260, 262; 709/201, 203

[56] References Cited

U.S. PATENT DOCUMENTS

| | | | |
|---|---|---|---|
| 4,809,269 | 2/1989 | Gulick ........................................ | 370/94 |
| 5,101,402 | 3/1992 | Chiu et al. ................................. | 370/17 |
| 5,265,215 | 11/1993 | Fukuda et al. ............................ | 395/325 |
| 5,359,730 | 10/1994 | Marron ...................................... | 395/650 |
| 5,440,690 | 8/1995 | Rege et al. ........................... | 395/200.02 |
| 5,495,615 | 2/1996 | Nizar et al. ............................... | 395/733 |
| 5,530,874 | 6/1996 | Emery et al. ............................. | 395/735 |
| 5,542,076 | 7/1996 | Benson et al. ........................... | 395/733 |
| 5,561,809 | 10/1996 | Elko et al. ................................ | 395/800 |
| 5,604,742 | 2/1997 | Colmant et al. ......................... | 370/396 |
| 5,659,758 | 8/1997 | Gentry et al. ............................ | 395/733 |
| 5,761,516 | 6/1998 | Rostoker et al. ........................ | 395/733 |

OTHER PUBLICATIONS

Parallelized Management of Advanced Program–to–Program Communications/VM in a Server Superstructure, IBM Technical Disclosure Bulletin, vol. 38, No. 02, Feb. 1995, pp. 319–320.

"Reduction CPU Utilization by Controlling Transmit Complete Interrupts", IBM Technical Disclosure Bulletin, vol. 38, No. 07, Jul. 1995, pp. 497–499.

*Primary Examiner*—Ayaz R. Sheikh
*Assistant Examiner*—Frantz Blanchard Jean
*Attorney, Agent, or Firm*—Floyd A. Gonzalez; David A. Fox; Cantor Colburn LLP

[57] ABSTRACT

An apparatus for a distributed system having a plurality of nodes and a switch network for passing messages between nodes, each message being sent from a source node to a target node. Each node is connected to the switch network by an adapter having a count register for adding the value of the packets in messages received by the adapter to the value in the count register and a threshold register for containing a desired threshold value. An interrupt generator generates interrupts when the value in the count register is equal to or greater than the value in the threshold register. The value in the threshold register may be changed under program control to enable or disable interrupts.

9 Claims, 5 Drawing Sheets

APPARATUS FOR FLEXIBLE CONTROL OF INTERRUPTS IN MULTIPROCESSOR SYSTEMS

BACKGROUND OF THE INVENTION

The present invention relates to controlling interrupts in multiprocessor systems, and more particularly relates to providing control of interrupts to application programmers of multiprocessor systems.

A multiprocessor distributed memory machine processes typically executing on different processors communicate with each other by sending and receiving messages. Sending and Receiving messages is usually accomplished in one of two modes:

(a) Synchronous mode—in this mode the two communicating processes execute a send or a receive (recv) function. The data sent by the sender using the send function call is received by the receiver using the recv function call.

(b) Asynchronous mode—in this mode the sending side sends a message using the send function call but the receiving side may not be expecting this message. The sent message needs to be handled by the receiver in a timely fashion to avoid losing messages or avoiding congestion in the network buffers where the message sits waiting for the receiver to pull it out from the network buffer. This is typically accomplished by setting up a mechanism such that the incoming message causes an interrupt to the system.

In IBM's implementation of Message Passing Interface (MPI), "synchronous mode" is also referred to as "polling mode", and "asynchronous mode" is also referred to as "interrupt mode". In polling mode, interrupts are essentially disabled. In interrupt mode, the sending node (origin) sends a message to the receiving node (target). When the message arrives at the target, an interrupt to the node is generated by the adapter on the target.

The flow chart for interrupt mode of operation at the target is shown in FIG. 1. The message from the origin is partitioned into fixed sized units called packets. All packets of a message are sent to the target. These packets arrive at the target at 10 (possibly out of order), and the adapter, to be discussed, copies the incoming data at 12 in the communication buffer (also called network buffer) area. The first packet of the message that arrives at the target causes an interrupt at 14 to be generated by the adapter to the system. The interrupt is received by the OS FLIH (operating system's first level interrupt handler) at 16. The operating system may be, for instance, the AIX operating system from IBM. As shown at 18, the FLIH decodes the interrupt to find the source of the interrupt. FLIH then calls the corresponding SLIH (second level interrupt handler). The SLIH is installed in the kernel by the MPI initialization process and is part of the adapter device driver. The SLIH in the device driver reads the interrupt mask on the adapter to determine from which adapter port (also called window) the interrupt was generated, shown at 20. The device driver looks up its tables to determine the PID (process id) of the job running in the user space window (assuming it was a user space interrupt), at 22. The device driver then sends a signal to the PID running user space job at 24, and then exits. The signal handler to field the signal sent by the device driver, is installed when the MPI library is initialized.

The operating system (AIX) scheduler marks the PID with the signal handler as a runnable entity and puts it in the queue of runnable processes at 26. The operating system dispatcher (AIX) eventually schedules the signal handler for execution at 28. The signal handler then receives the incoming data and absorbs it into the ongoing computation. As shown at 30, the handler reads the headers of the incoming packets and determines the number of packets in the message. The handler waits and receives all packets of the message, before enabling interrupts (by setting the appropriate threshold) before returning control to the application. Previous to the present invention the adapter generated only one interrupt for a particular threshold. This means that if two packets arrive at the target node and the interrupt threshold has not been changed since before the first packet arrived, only the first packet will cause an interrupt.

It is clear that the cost of an interrupt is very high. On the IBM RISC System/6000 Scalable POWERparallel (SP) system containing Power-2 (Model 591) wide nodes with the TB2/TB3 adapter between each node and the SP switch (SPS) the time from when the data reaches the target to the time the handler is invoked may be as high as 65 microseconds.

U.S. Pat. No. 5,265,215 issued Nov. 23, 1993 to Fukuda et al. for MULTIPROCESSOR SYSTEM AND INTERRUPT ARBITER THEREOF discloses a tightly coupled multiprocessor system in which I/O interrupts are distributed to respective processors in accordance with load conditions of the processors.

U.S. Pat. No. 5,359,730 issued Oct. 25, 1994 to Marron for METHOD OF OPERATING A DATA PROCESSING SYSTEM HAVING A DYNAMIC SOFTWARE UPDATE FACILITY discloses a dynamic software update facility in a data processing system. Pieces of software in large data processing systems are updated using interrupts without having to shutdown the whole system, thereby allowing other parts of the system to continue operation.

U.S. Pat. No. 5,495,615 issued Feb. 27, 1996 to Nizar et al. for MULTIPROCESSOR INTERRUPT CONTROLLER WITH REMOTE READING OF INTERRUPT CONTROL REGISTERS discloses a multiprocessor programmable interrupt controller system which has an interrupt bus distinct for the system bus for handling interrupt-related messages.

U.S. Pat. No. 5,561,809 issued Oct. 1, 1996 to Elko et al. for IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION discloses a mechanism for communicating messages between processors in a multiprocessor system in either a synchronous or an asynchronous operation without using interrupts.

IBM Technical Disclosure Bulletin, Vol. 38, No. 02, February 1995 for PARALLELIZED MANAGEMENT OF ADVANCED PROGRAM-TO-PROGRAM COMMUNICATIONS/VM IN A SERVER SUPERSTRUCTURE discloses a method for letting multiple threads of execution running in parallel on multiple control processing units manage a set of Advanced Program-To-Program Communications/VM (APPC/VM) conversations wherein one instance of an interrupt handler is registered for each APPC/VM resource being managed.

IBM Technical Disclosure Bulletin, Vol. 38, No. 07, July 1995 for REDUCING CPU UTILIZATION BY CONTROLLING TRANSMIT COMPLETE INTERRUPTS discloses a method that significantly reduces the number of interrupts generated by LAN adapter, helping to alleviate system CPU utilization by delaying transmit complete interrupts.

SUMMARY OF THE INVENTION

The present invention provides a mechanism that allows the user to minimize the number of interrupts the application caused and allows application programmers to avoid the cost of unnecessary interrupts in a communication subsystem. An API (Application program interface) to allow the users to control interrupts is also described.

There are several applications (e.g. client/server where some nodes act as clients sending requests to some other nodes which act as servers) in which it is necessary that the server operate in interrupt mode so that it can respond to requests from clients promptly. Since the server does not know which node will send which request at any given time, it cannot operate in polling (synchronous mode). However the nodes which act as clients have more information regarding when messages will be arriving. For example, a client node (origin) may send a request to a server node (target) for some data. The client then may post a receive buffer to absorb the requested data that would be sent by the server (target). In such cases the interrupt caused by the incoming data (at the client node) can be avoided thereby saving the cost of servicing an interrupt. For this the user should have the ability to disable interrupts from the adapter when it is going to be waiting for incoming data which it knows is bound to arrive shortly.

The initial version of the MPI library on the SP system did not have a mechanism by which a user could disable interrupts from the adapter when running in interrupt mode. The mode of operation was decided by the user before executing his program by setting an environment variable (MP_CSS_INTERRUPT). This was fixed for all nodes on the system. If the environment variable was set to YES, then all nodes (client or server) operated in interrupt mode.

The present invention provides mechanisms that allow the user programmer to control interrupts more efficiently. The mechanisms allow the user programmers to disable/enable or query the state of interrupts. Using these mechanisms the user can avoid unnecessary interrupts (for example on the client nodes as described above) thereby causing the application to run faster.

It is thus a primary objective of the present invention to provide for program control for enabling or disabling interrupts from messages being received by an adapter from a switch network to a target.

It is also an objective of the present invention to provide a program for querying whether interrupts are enabled or disabled in an adapter connected to a switch network for a node.

It is also an objective to provide program control for enabling interrupts on an adapter connected to a switch network for a node.

It is also an objective to provide program control for disabling interrupts on an adapter connected to a switch network for a node.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
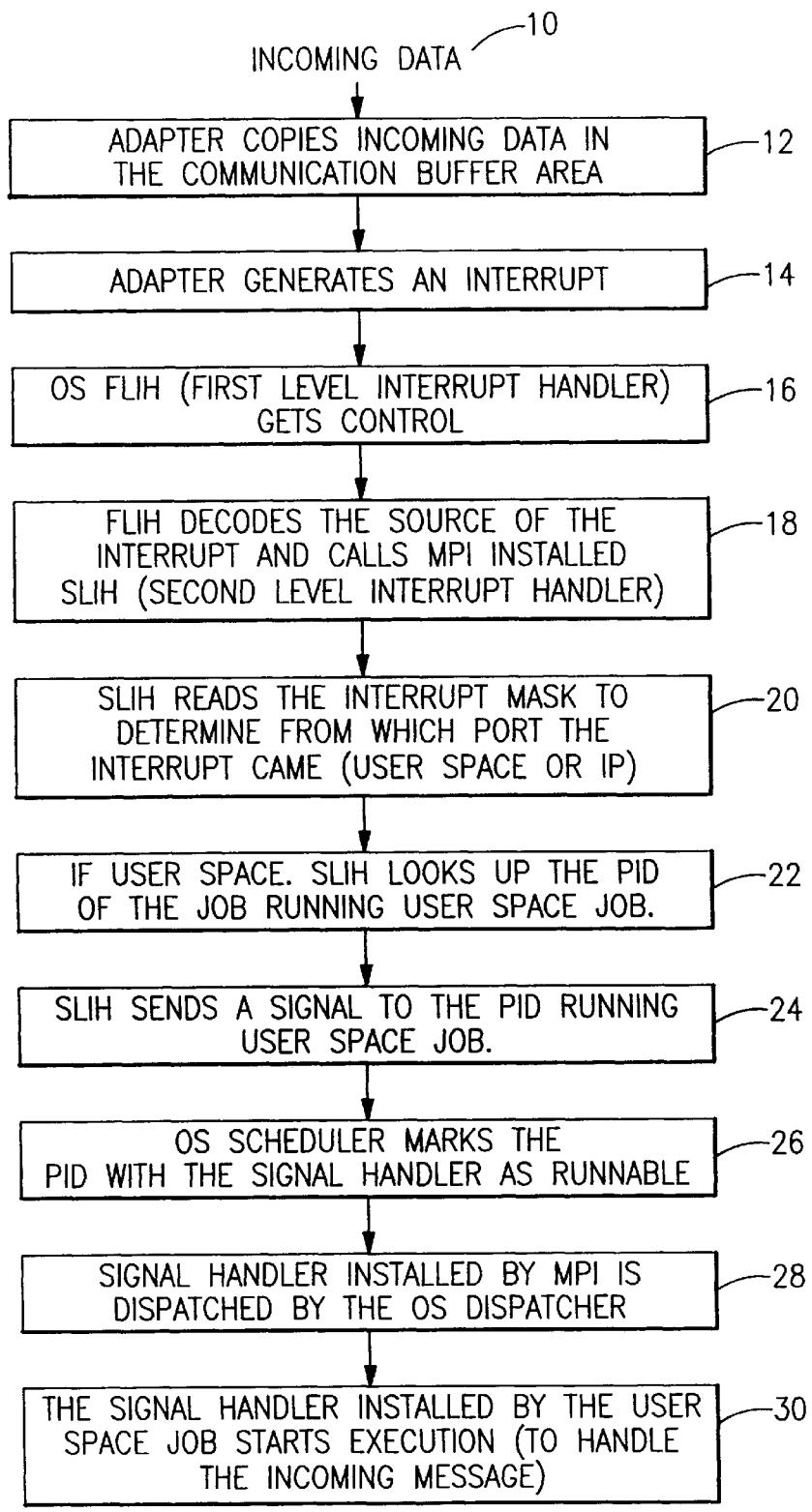
FIG. 1 is a diagrammatic illustration of the flow in a prior art operation in the interrupt mode.
Figure 2:
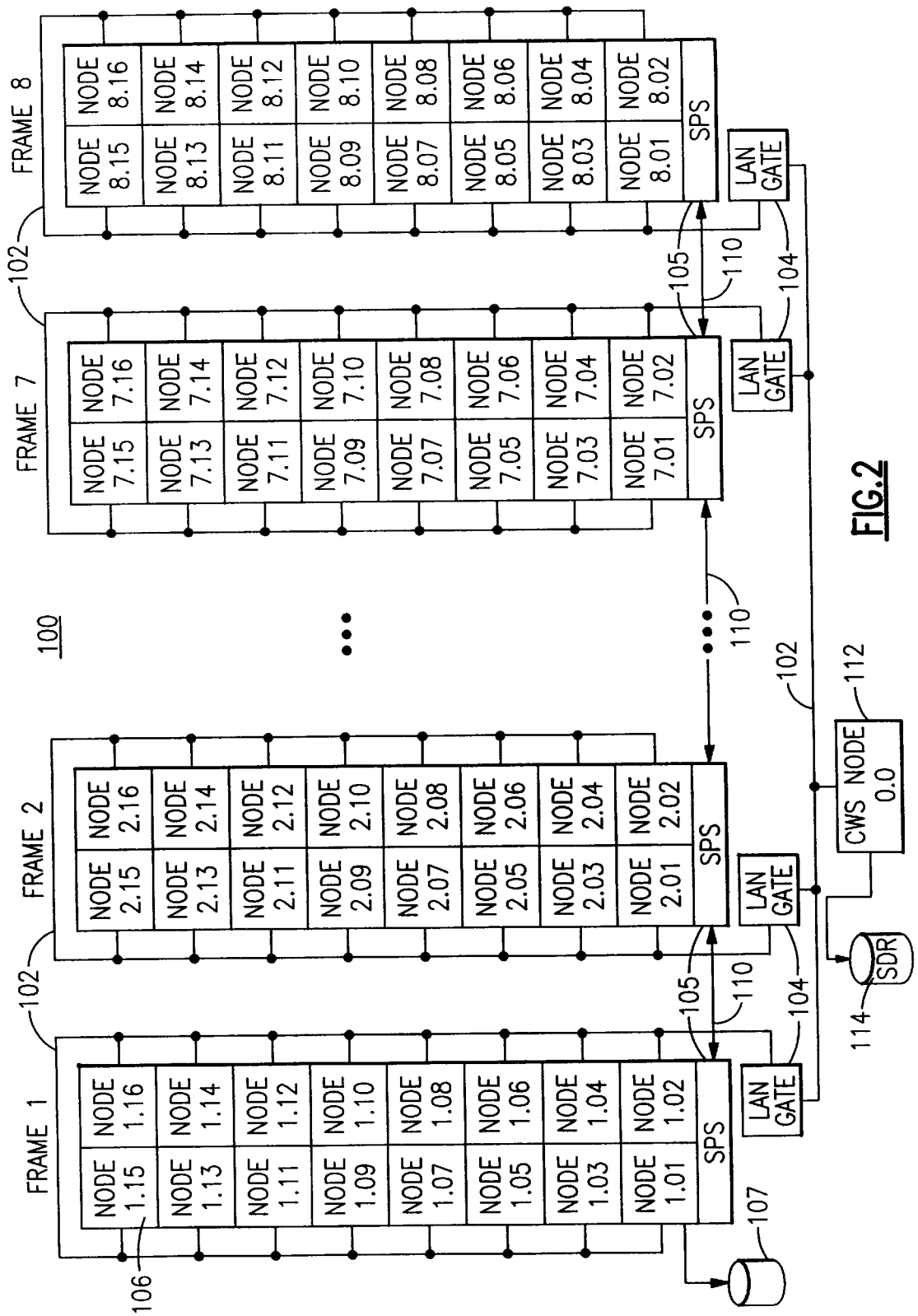
FIG. 2 is a schematic diagram of a system usable with the present invention.

FIG. 2 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the nodes 106 is connected to the SPS by an adapter, as discussed in connection with FIG. 3. Each SPS 105 of each frame is connected to the neighboring SPS 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105. The connection of the nodes 106 to the SPS 105 is shown and discussed in U.S. Pat. No. 5,453,978 issued Sep. 26, 1995 to Sethu, and owned by the assignee of the present invention.

Figure 3:
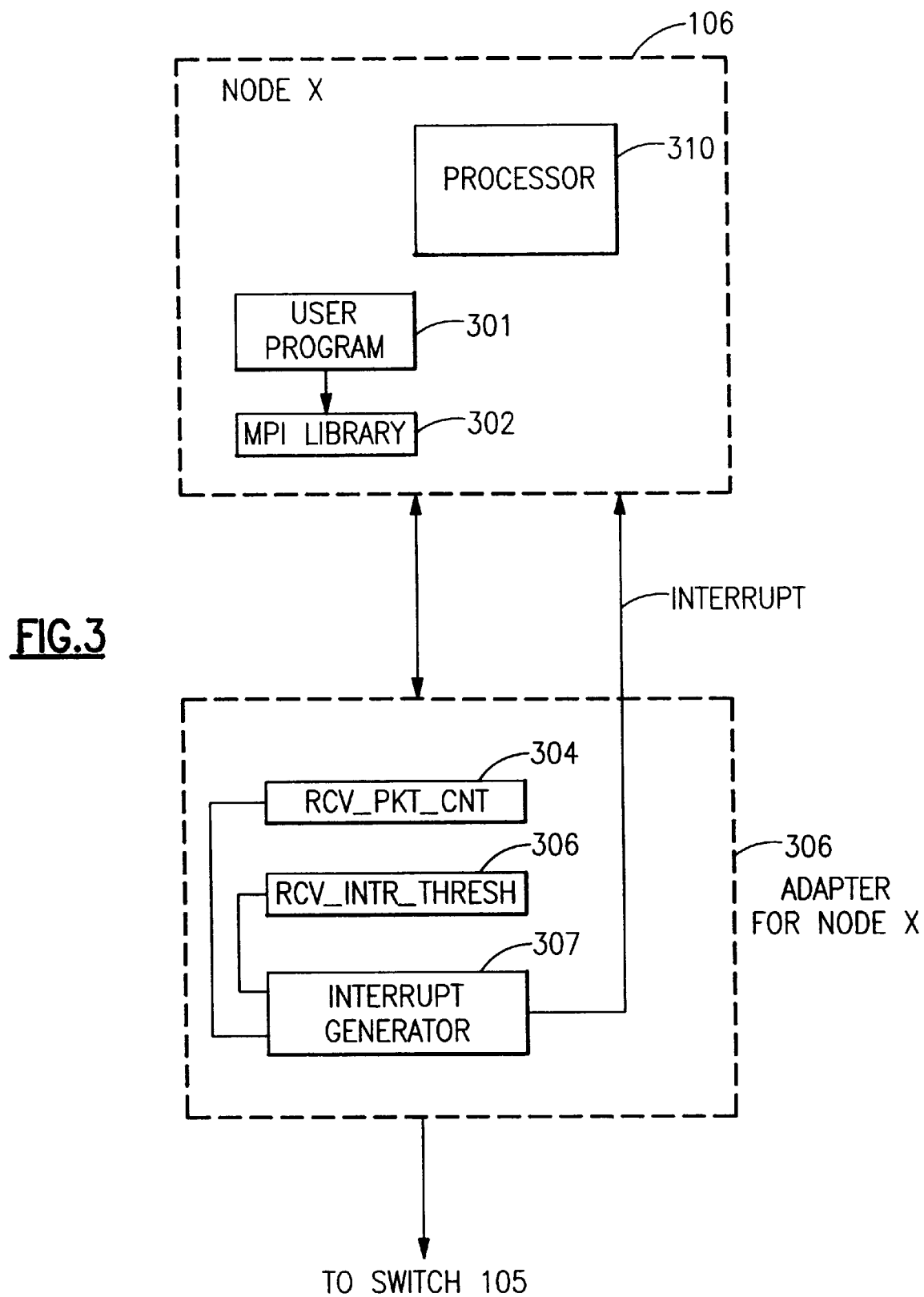
FIG. 3 is a schematic diagram of a node and associated adapter of the system of FIG. 2.

FIG. 3 is a schematic diagram of one of the nodes 106 connected to the SPS 105 through an adapter 300. The adapter 300 may be an SP TB2 or TB3 adapter available from IBM. The workstation of each node 106 includes a processor 310 and a user program 301, which calls an MPI library 302. The library 302, under control of the user program 301, uses two unsigned 64 bit integers to control the state of interrupts. These variables reside in registers 304 and 306 on the adapter whose values are used by an interrupt generator 307 to generate interrupts, as will be explained. These variables are:

1. Receive Packet Count (rcv_pkt_cnt): This variable in register 304 keeps a count of the number of packets received by the node; and
2. Receive Interrupt Threshold (rcv_intr_thresh): This variable in register 306 is checked by the adapter to see if the rcv_pkt_cnt is greater than rcv_intr_thresh. If YES, and the rcv_intr_thresh is not the same as what it was when the previous interrupt was raised to the adapter's node, then the adapter generates an interrupt by the interrupt generator 307.

The node 106 can disable adapter interrupts by setting the threshold in 306 to the largest unsigned 64 bit integer. The node 106 typically can enable interrupts by setting the adapter threshold to 1 more than the rcv_pkt_cnt.

Three user callable functions are provided by the MPI library 302 to allow users more control over interrupts. These calls are:

1. mpc_queryintr( ): This call allows a user to check the state of interrupts on the node on which this call is made. The library 302 returns 0 if interrupts are disabled, and 1 if interrupts are enabled. This call is especially useful for other libraries using MPI (such as the PESSL product available from IBM) which need interrupts to be enabled while the library code is executing. The library 302 can save the state of interrupts before the library 302 was called, set the state of interrupts to the way library 302 requires and then restore the state of interrupts once the library 302 completes executing and before returning control to the user program.
2. mpc_disableintro( ): This call allows a user to disable interrupts on the node 106 on which this call is executing. This call returns a 0 if the interrupts were successfully disabled and returns –1 if the MPI library 302 was unable to disable interrupts for some reason.
3. mpc_enableintr( ): This call allows a user to enable interrupts on the node 106 on which this call is executing. This call returns a 0 if the interrupts were successfully enabled and returns –1 if the MPI library 302 was unable to enable interrupts for some reason.

Figure 4:
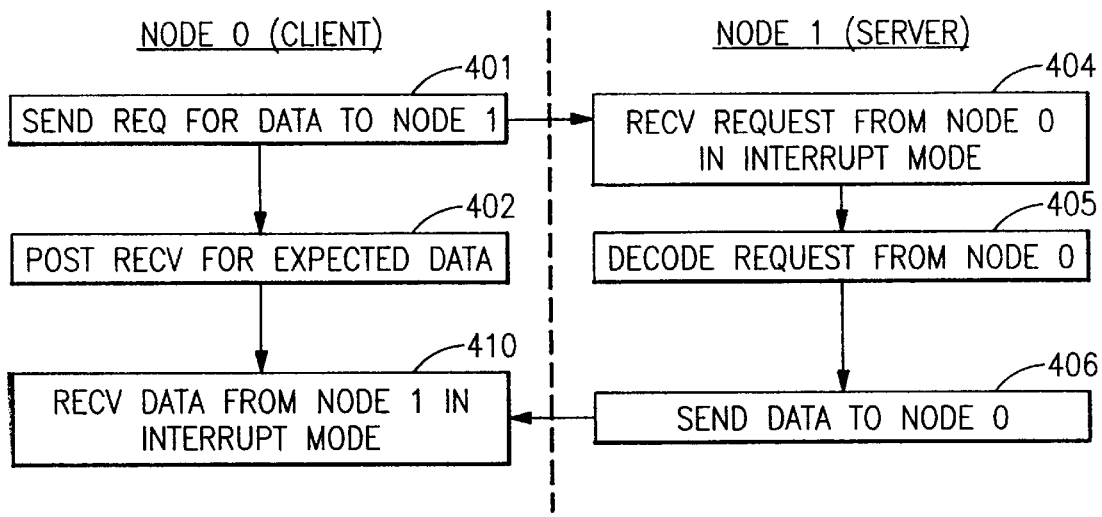
FIG. 4 is a diagrammatic illustration of the flow of a message exchange between a client and a server a when the present invention with interrupts enabled such that the adapters are the interrupt mode.
Figure 5:
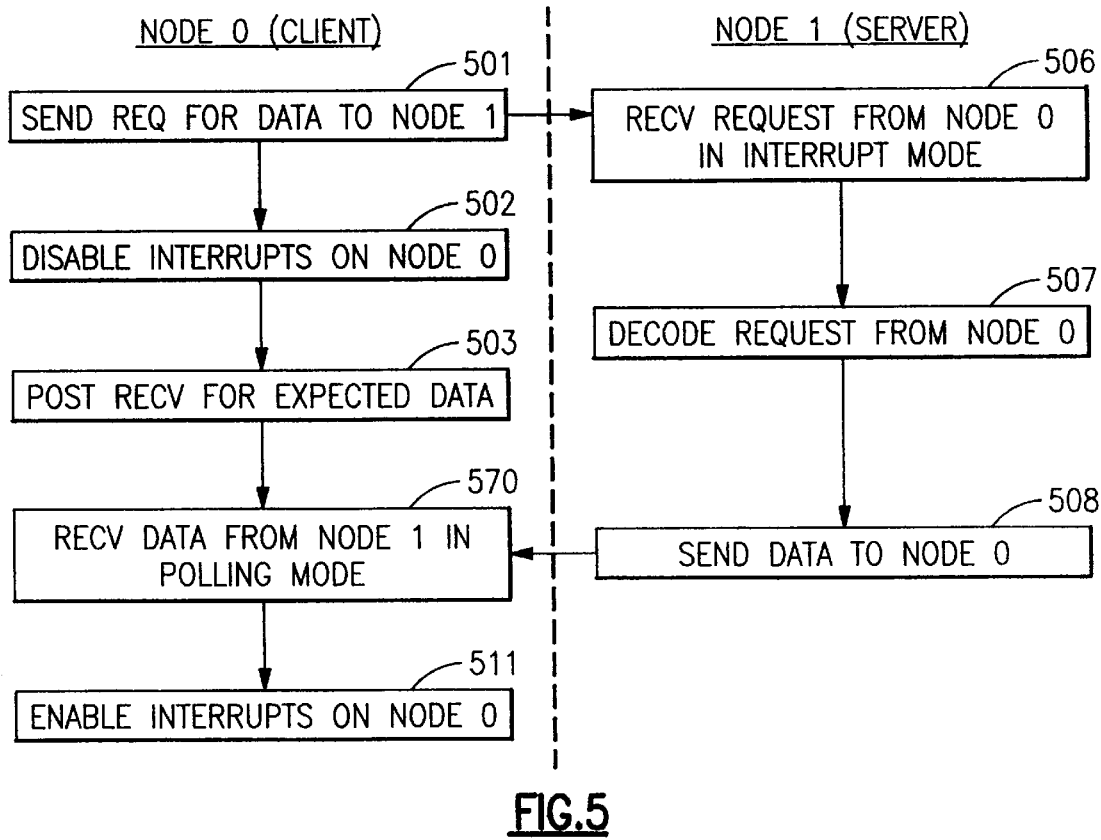
FIG. 5 is a diagrammatic illustration of the flow of the message exchange of FIG. 4 with of the use of the present invention with client interrupts disabled at the client node such that the client is in the polling mode.

FIGS. 4 and 5 show examples of the flows where the user application benefits by saving the cost of an unnecessary interrupt. FIG. 4 is an illustration of the flow with interrupts enabled in the adapter 300 such that the invention is in an interrupt mode like a prior art device. At 401, node 0 (the client node) sends a request for data to node 1 (the server node). At 402, node 0 posts receive to node 0 such that node 0 is prepared for the expected data requested from node 1. At 404, node 1 receives the request from node 0 in interrupt mode, that is, the adapter 300 for node 1 has the threshold value in Rcv_Intr_thresh register 306 is set at 1 above the value in the Rcv_Pkt_Cnt register 304 by an mpc_enableintro call, as explained. At 405, node 1 decodes the request for node 0 by, for instance, the procedure set out in FIG. 1. At 406, node 1 sends the data requested by node 0, back to node 0. At 410, node 0 receives the requested data from node 1, as it has been instructed to receive at 402. The receipt of the data at 410 is with the adapter 300 for node 0 being set in the interrupt such that the data causes an interrupt in accordance, for instance, with the flow of FIG. 1.

FIG. 5 shows the flow for exchange of data between node 0 (the client) and node 1 (the server) with the interrupts disabled in the adapter 300 of node 0 and enabled in the adapter 300 of node 1. At 501, node 0 sends a request for data to node 1. At 502, interrupts are disabled on node 0 by setting the value in the Rcv_Intr_thresh register 306 set to the maximum value by an mpc_disableintr( ) call, as previously explained. Node 0 is then post received (post recv) at 503 for the expected data from node 1. At 506, node 1 receives the request for data from node 0, with the adapter 300 of node 1 having interrupts enabled, as previously explained. At 507, node 1 decodes the request from node 0, and at 508, sends the requested data to node 0, as discussed in connection with FIG. 4. Returning to node 0, at 510, node 0 receives the data from 1, but since node 0 is now expecting the data because of the post recv at 503, node 0 receives the data in the polling mode rather than an interrupt mode. After the data has been received at 510, node 0 enables interrupts on its adapter 300 at 511, in the manner previously discussed.

It should be noted that the disabling of interrupts on the client side is done outside the critical path (i.e. at 502 after the request message has been sent to the server at 501). The enabling of interrupts on the client side at 511 is in the critical path but this cost is small (in the order of 0.5 us) compared to the cost of servicing an interrupt (65 us). It should also be noted that this allows the user the flexibility of allowing segments of the program to run in interrupt mode or polling mode, and that this disabling and enabling of interrupts can be done multiple times.

Figure 6:
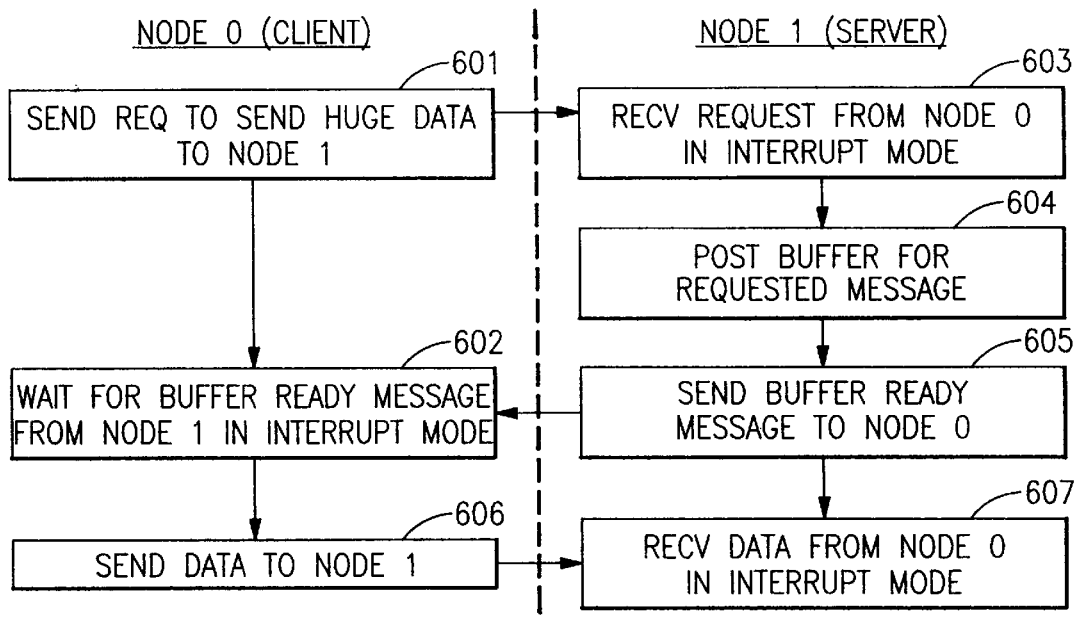
FIG. 6 is a diagrammatic illustration of the flow when the client wants to send a huge amount of data to a server to be stored at the server with the present invention with both adapter interrupts enabled such that the adapters are in the interrupt mode.
Figure 7:
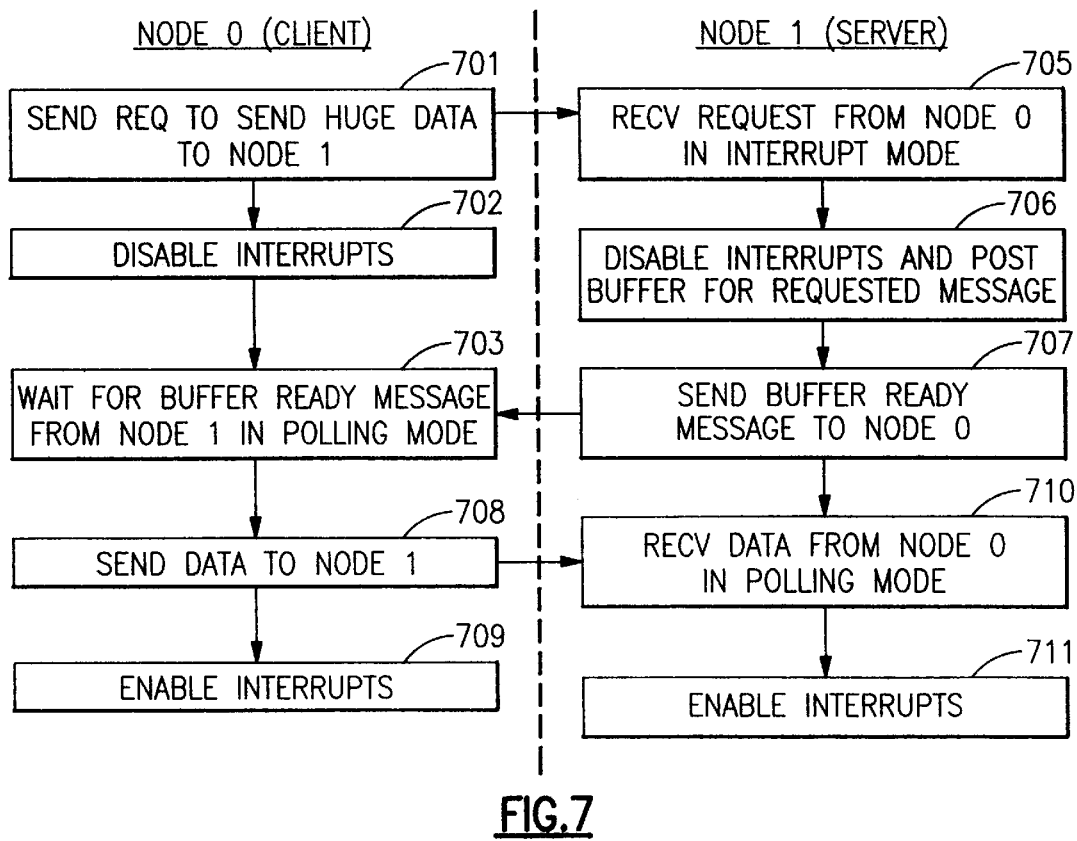
FIG. 7 is a diagrammatic illustration of the flow when the client wants to send a huge amount of data to a server to be stored at the server with the present invention with both the client and server interrupts disabled such that the client and server are in the polling mode during data transfer.

FIGS. 6 and 7 show examples of the sequence of events when the client node wants to send a huge amount of data to the server node to be stored at the server. In FIG. 6, client interrupts are enabled, and in FIG. 7, client interrupts are disabled. In FIG. 6, at 601, the client node sends a request to send a huge amount of data to node 1. At 602, the client node waits for the buffer ready message from node 1 with interrupts enabled such that the client node is in the interrupt mode. At 603, the server node receives the request from node 0. The server node adapter also has interrupts enabled such that the server node is in the interrupt mode. At 604, the server node posts its buffer for the requested message. At 605, the server node sends a buffer ready message to node 0 indicating that the server node is ready to receive the data. When the client node at 602 receives the buffer ready message from the server node, the client node sends the data to node 1 at 606. At 607, the server node receives the data from node 0 in the interrupt mode. As shown, the entire operation results in an interrupt on the client node and multiple interrupts on the server since the data sent from node 0 comprises multiple packets, and possibly multiple messages.

FIG. 7 shows the same transaction as shown in FIG. 6 with the client and server adapters having their interrupts disabled such that both the client and server are in the polling mode during the data transfer. At 701, the client node sends a request to send a huge amount of data to node 1. At 702, the client node disables its interrupts, as explained. At 703, the client node waits for a buffer ready message from node 1, with node 0 being in the polling mode. At 705, the server node receives the request from node 0 in the interrupt mode. At 706, the server node disables interrupts and posts its buffer for the requested message. At 707, the server node sends a buffer ready message to node 0. Returning to the client node, at 703 the client node receives the buffer ready message sent at 707, and sends the data to node 1. After the data is sent to the server node at 708, the client node enables interrupts at 709. At 710, the server node receives the data from node 0 in the polling mode. After the data has been received at 710, the server enables interrupts at 711. As shown, the operation results in only a single interrupt at 705 to receive the request from the client. The rest of the data transfers are done in the polling mode without interrupts.

The precise mechanism disclosed is one embodiment only. All that is required to carry out the invention is to provide some mechanism in the hardware to enable and disable interrupts when the next packet arrives. Many other kinds of mechanisms are possible, for example an adapter could use a flag that indicates whether or not interrupts are enabled. One could simply turn the flag on or off. If it is on, an interrupt would be caused when the next packet arrives and the adapter would turn off the flag. Other schemes may be envisioned by one skilled in the art.

While we have illustrated and described the preferred embodiment of our invention, it is to be understood that we do not limit ourselves to the precise construction herein disclosed, and the right is reserved to all changes and modifications coming within the scope of the invention as defined in the appended claims.

What is claimed is:

1. An apparatus for controlling interrupts comprising:

a node for sending and receiving messages;

a switch network for passing messages to and from said node;

an adapter connected between said node and said switch network;

a threshold register in said adapter for holding a threshold value;

a count register for counting message packets received over said switch network for said node;

an interrupt generator in said adapter for comparing a value in said count register to the value in said threshold register and sending an interrupt to said node when the value in said count register is equal to or greater than the value in said threshold register; and a program in said node changing the value in said threshold register under program control to a desired value, thereby controlling the sending of interrupts to said node.

2. The apparatus of claim 1 wherein said program includes a query routine for checking the interrupt status of said interrupt generator.

3. The apparatus of claim 1 wherein said program includes a disable routine for disabling the interrupt of said interrupt generator by setting the value in said threshold register to a very high value.

4. The apparatus of claim 1 wherein said program includes an enable routine for enabling the interrupt of said interrupt generator by setting the value in the threshold register to one more than the value in said count register such that the receipt of a message for said node will cause an interrupt to said node.

5. An apparatus comprising:

a distributed system having a plurality of nodes, a switch network for passing messages between nodes, each message being sent from a source node to a target node, and an adapter connecting each node to said switch network;

each adapter having a count register for adding the value of the packets in messages received by the adapter to the value in the count register, a threshold register for containing a desired threshold value, and an interrupt generator for comparing the value in said count register to the value in said threshold register and generating interrupts when the value in said count register is equal to or greater than the value in said threshold register.

6. The apparatus of claim 5 further comprising a program for placing a desired value from said distributed system into the threshold register of a specified adapter.

7. The apparatus of claim 6 wherein said program interrogates the contents of said threshold register, thereby indicating if interrupts are enabled or disabled.

8. The apparatus of claim 6 wherein said program places a very large number in said threshold register, thereby disabling interrupts.

9. The apparatus of claim 6 wherein said program places a value in said threshold which is a specified value larger than the value in said count register, thereby enabling interrupts.

* * * * *